United States Patent
Panek et al.

[11] Patent Number: 5,598,623
[45] Date of Patent: Feb. 4, 1997

[54] METHOD FOR A UNITARY ASSEMBLY OF TUBING AND A PRESSED ON, INTERFERENCE FIT, TERMINATING FITTING

[75] Inventors: John G. Panek, Churchville; Richard L. Gottorff, Rochester, both of N.Y.

[73] Assignee: ITT Corporation, New York, N.Y.

[21] Appl. No.: 445,737

[22] Filed: May 22, 1995

Related U.S. Application Data

[62] Division of Ser. No. 155,460, Nov. 19, 1993, Pat. No. 5,487,573.

[51] Int. Cl.$^6$ .................................................. B23P 17/00
[52] U.S. Cl. .............................. 29/525; 29/523; 29/557; 29/890.15
[58] Field of Search .......................... 29/523, 525, 557, 29/890.14, 890.15; 285/382, 382.4, 382.5, 386, 387, 332, 392

[56] References Cited

U.S. PATENT DOCUMENTS

| | | |
|---|---|---|
| 545,877 | 9/1895 | Curlett . |
| 609,030 | 8/1898 | Keller . |
| 1,941,174 | 12/1938 | Jensen . |
| 2,166,078 | 7/1939 | Stephenson . |
| 2,175,456 | 10/1939 | Couty . |
| 2,515,219 | 7/1950 | Harding . |
| 2,522,194 | 9/1950 | Richardson . |
| 2,542,701 | 2/1951 | Press . |
| 3,494,643 | 2/1970 | Longshaw et al. . |
| 3,817,562 | 6/1974 | Cook et al. . |
| 3,847,421 | 11/1974 | Eschbaugh et al. . |
| 4,025,092 | 5/1977 | Wakefield . |
| 4,026,583 | 5/1977 | Gottlieb . |
| 4,128,264 | 12/1978 | Oldford . |
| 4,513,489 | 4/1985 | Sugiyama et al. ............. 29/525 X |
| 4,648,634 | 3/1987 | Kelch . |
| 4,669,761 | 6/1987 | Huling . |
| 4,765,661 | 8/1988 | Fukushima et al. . |
| 4,796,927 | 1/1989 | Buna et al. . |
| 4,887,853 | 12/1989 | Flowers et al. . |

FOREIGN PATENT DOCUMENTS

| | | |
|---|---|---|
| 1022061 | 1/1958 | Germany . |
| 3322797 | 9/1984 | Germany . |
| 352300 | 7/1931 | United Kingdom . |
| 576544 | 4/1946 | United Kingdom . |
| 709061 | 5/1954 | United Kingdom . |

*Primary Examiner*—S. Thomas Hughes
*Attorney, Agent, or Firm*—Thomas N. Twomey; J. Gordon Lewis

[57] ABSTRACT

A unitary assembly of tubing and an end fitting. The end fitting includes a threaded fastener fitting having a tubular bore extending therethrough. A conical transition is coaxially provided to the bore at the thread/hex interface where the bore constricts. The end of the tubing is coaxially impacted, expanded and sized to an external configuration and dimension that achieves an interference fit relative to the tubular bore through the end fitting. The non-expanded end of the tubing is inserted into the larger of the two bores in the end fitting passed the conical transition and through the smaller bore until it experiences interference from the expansion. The interference is overcome by pressing the expansion into the bore in the end fitting until the expansion is completely seated into the end fitting. The expanded tube and end fitting is machined coaxially using a five step tool. The tool machines the inside diameter of the tube where it had been reduced during end forming, swages the expanded tube into the end fitting bore below the hex, machines the female pilot land, machines the O-ring gland, and machines the thread lead on the end fitting.

15 Claims, 2 Drawing Sheets

METHOD FOR A UNITARY ASSEMBLY OF TUBING AND A PRESSED ON, INTERFERENCE FIT, TERMINATING FITTING

This application is a division of application Ser. No. 08/155,460, filed on Nov. 19, 1993, now U.S. Pat. No. 5,487,573.

FIELD OF THE INVENTION

This invention relates to tubing connectors and, more particularly, to such connectors wherein the terminating fitting is brazed, welded, staked, or extruded onto the associated tube.

BACKGROUND OF THE INVENTION

Tubing connectors for threadless pipe, tubing, conduit and like are known and have been widely used in the art. The tubes are mechanically connected by means of a threaded fitting which fits over an expansion on the tube end and are screwed together to clamp the expansion to the mating part. These known tubing connectors are exemplified by U.S. Pat. Nos. 2,522,194 and 3,494,643. These known tubing connectors have the disadvantage of being susceptible to leaking because gaps, inherent to the design, of significant size occur between the expansion, or flare, and fitting to allow the expansion to deform during assembly. The resultant deformation allows vibration and the like to loosen the fitting assembly and unseat the sealing surfaces, and repeated reassembly and sealing to other identical mating components is rendered impossible.

Tubes that are brazed to fittings via salt, flame, induction, or furnace braze processes or welded via magnesium inert gas, tungsten inert gas, or resistance welding processes are also known. These known processes are exemplified by U.S. Pat. No. 4,887,853. These known processes have the disadvantage of using large amounts of energy to heat and cool components, polluting the environment and requiring pre- and post-treatments and fluxes, all of which are hazardous, and produce a braze or weld joint that forever represents a leak path.

Fittings that are impact extruded onto tubes are known. These known processes have the disadvantage that great expense causes these processes to currently be commercially inviable.

SUMMARY OF THE INVENTION

Briefly, a unitary assembly of tubing with a threaded terminating fastener is provided. The threaded fitting includes a tubular opening therein extending through the fitting along the longitudinal axis thereof. A conical constriction is provided at the thread/hex interface. A non-expanded end of an expanded tube is received within the larger opening of the fitting. Insertion continues until expansion and fitting interference has been overcome and the expansion is completely seated in the fitting. The internal characteristics are machined coaxially using a special five step tool.

The present invention provides a low cost, leak free tube and fitting assembly. This development provides a tube and fitting connection without a potential leak path, such as is present in a braze or weld joint. The present invention also provides better dimensional and strength characteristics than a step bead, that may distort in the area of the O-ring gland and leak. The present invention can be made using a pollution free, low tech process that is also less costly than brazing, welding or impact extrusion. The leak free characteristics eliminate the loss of fluid and increases the reliability of products that use tube and fitting connections. Present technology uses welding, brazing, end forming, or impact extrusion. The first two have inherent leak potential, the third is structurally and dimensionally inferior and is prone to distortion, and the fourth is expensive.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 9:
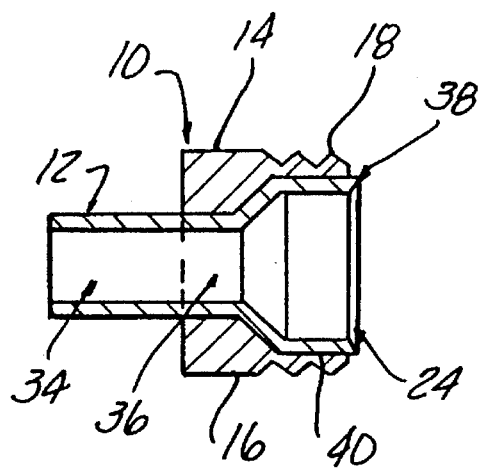
FIGS. 9 and 10 are sectional and end views respectively of the finished tube and fitting assembly according to the present invention.
Figure 10:
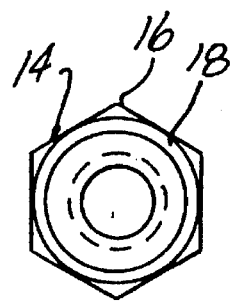

Referring now to FIGS. 9 and 10, there are shown generally sectional and end views respectively of a finished tube and fitting assembly 10 in accordance with the present invention. The tube 12 and fitting 14 are connected along parting line 40. The terminating fitting 14 includes a hexagonal head portion 16 and a threaded connecting portion 18 which is joined with and coaxially extends away from the head portion 16. The material of the end fitting 14 and tube 12 may comprise any desired metallic material, such as aluminum, copper, steel or the like.

Figure 1:
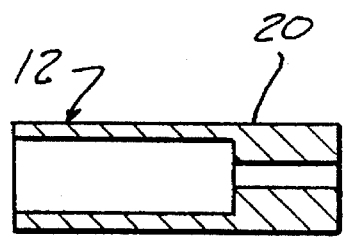
FIGS. 1 and 2 are sectional and end views respectively of a first hit impaction of a tube, during an end forming operation according to the present invention.
Figure 2:
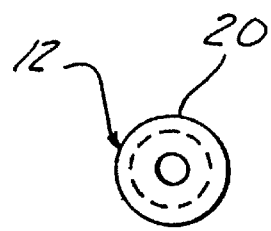

Referring now to FIGS. 1 and 2, there are shown sectional and end views respectively of a first hit impaction, which maintains the original outside diameter of the tube 12, and coaxially constricts the inside diameter and thickens the wall 20 three fold.

Figure 3:
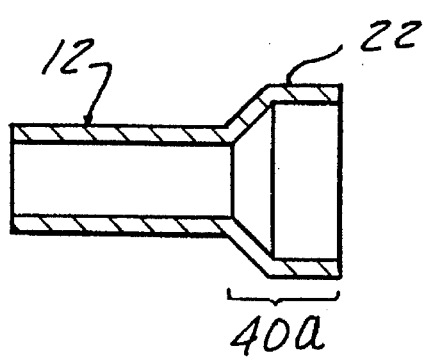
FIGS. 3 and 4 are sectional and end views respectively of a second hit expansion and the third hit sizing of a tube, during the end forming operation according to the present invention.
Figure 4:
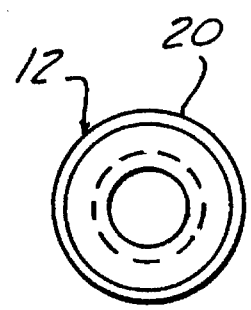

Referring now to FIGS. 3 and 4, there are shown sectional and end views respectively of a second hit expansion, which coaxially expands the impacted material to an interference fit outside diameter expansion surface 22 relative to the larger of the two inside diameters of the fitting 14 and rough sizes the inside diameter to a machineable condition relative to the dimension of the female pilot land 24 of the finished assembly 10. There is also shown in FIGS. 3 and 4 sectional and end views respectively of a third hit sizing, which sizes the length of the end form relative to the transition of the outside diameters and the non-end formed tube end to provide an exact mating surface 40a to an inside diameter surface 40b and length capability from the hex shoulder to the opposite end. The mating surface 40a of the formed end of the tube 12 and the inside diameter surface 40b of the fitting forming a pressed on, interference fit along parting line 40 as illustrated in FIG. 9.

Figure 5:
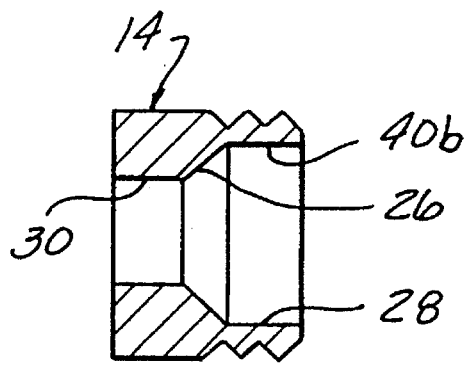
FIGS. 5 and 6 are sectional and end views respectively of a fitting, prior to an assembling operation according to the present invention.
Figure 6:
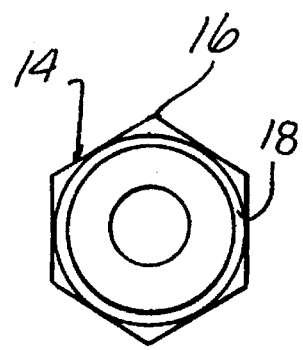

Referring to FIGS. 5 and 6, there are shown sectional and end views respectively of the fitting 14 including the conical transition 26 from the major and minor inside diameters 28 and 30 respectively, coaxial to the threaded and hexagonal portions 18 and 16 respectively.

Figure 7:
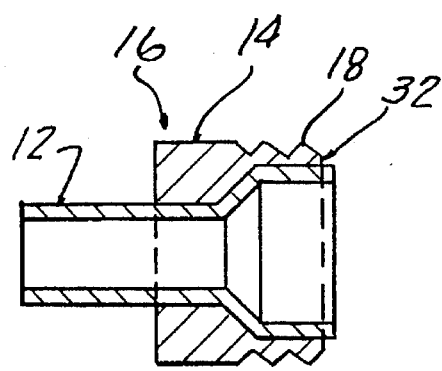
FIGS. 7 and 8 are sectional and end views respectively of the fitting pressed onto the formed end of the tube after the assembling operation according to the present invention.
Figure 8:
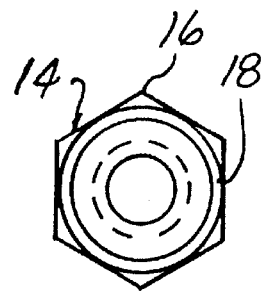

Referring to FIGS. 7 and 8, there are shown sectional and end views respectively of the tube and fitting assembly which shows the expansion surface 22 extending beyond the thread lead 32 on the fitting 14 so both may be machined simultaneously and the interference fit parting line 40 which eliminates any chance that a gap between tube 12 and fitting 14 will allow the tube 12 to deform into the fitting 14.

Referring to FIGS. 9 and 10, there are shown sectional and end views respectively of the finished tube and fitting assembly 10 which shows the constricted portion 34 of the tube 12 is open to the inside diameter along the entire length of the tube 12, the portion 36 of the tube 12 inside the hex 16 swaged into the hex 16, the female pilot land area 24, the O-ring gland 38 and precise mating seam or parting line 40 between tube 12 and fitting 14.

A method for forming a unitary assembly of tubing with a threaded terminating fastener is therefore disclosed. The method includes the steps of providing a threaded fitting 14 having a tubular opening therein extending through the fitting 14 along the longitudinal axis thereof, providing a conical transition 26 at the thread/hex interface in the fitting 14, providing a tube 12 with a coaxial impacted, expanded, and sized end to an interference dimension relative to the inside diameter of the fitting 14, inserting the non-expanded end of the tube 12 through the major inside diameter of the fitting 14 until interference is encountered, pressing the tube 12 into the fitting 14 in coaxial alignment until the fitting 14 is completely seated and finishing the inside diameter of the tube 12 coaxially with the fitting 14 so that the tube inside diameter is consistent over its entire length, wherein the tube 12 is swaged into the inside of the hex, the female pilot land and the O-ring gland are machined, and the overall length of the fitting 14 is machined concurrently with the tube 12 at the thread lead. It is believed that the tube and fitting assembly 10 as described above is superior in form, fit, function and cost competitiveness.

What has been taught, then, is a method and apparatus for providing a unitary assembly of tubing and a terminating fitting facilitating, notably, a pressed-on fitting and which overcomes the disadvantages of the prior art. It will be appreciated by those skilled in the art, that the present invention provides consistency and reliability of the completed connection heretofore deemed unattainable at a marketable cost. The form of the invention illustrated and described herein is but a preferred embodiment of the teachings. It is shown as an illustration of the inventive concepts, however, rather than by way of limitation, and it is pointed out that various modifications and alterations may be indulged in within the scope of the appended claims.

What is claimed is:

1. A method for forming a unitary assembly of tubing with a threaded terminating fastener comprising the steps of:

providing a threaded fitting having a tubular opening therein extending through said fitting along a longitudinal axis thereof and an enlarged major inside diameter opening adjacent one end thereof;

providing a tube having an enlarged diameter portion adjacent one end thereof;

inserting said tube through said enlarged major inside diameter opening of said threaded fitting; and press fitting said enlarged diameter portion of said tube with an interference fit within said enlarged major inside diameter opening of said threaded fitting.

2. The method of claim 1 further comprising the steps of:

impacting an end of said tube to increase a wall thickness by approximately three fold;

expanding said end of said tube having said thickened wall; and sizing said expanded end of said tube to desired coaxial minor and major diameters with a conical transition therebetween sufficient to provide interference fit with said enlarged major diameter opening of said fitting.

3. The method of claim 1 further comprising the steps of:

inserting a non-expanded end of said tube through said enlarged major inside diameter opening of said fitting until interference is encountered; and pressing said tube into said fitting in coaxial alignment until said fitting is completely seated.

4. The method of claim 1 further comprising the step of finishing an inside diameter of said tube coaxially with said fitting so that an inside diameter of said tube is substantially constant over a longitudinal length.

5. The method of claim 1 further comprising the step of machining a female pilot land on an exposed end of the unitary assembly of tubing and fastener.

6. The method of claim 1 further comprising the step of machining an O-ring gland on an exposed end of the unitary assembly of tubing and fastener.

7. The method of claim 1 further comprising the step of machining an overall length of said unitary assembly of tubing and fastener.

8. A method for forming a unitary assembly of tubing with a threaded terminating fastener, said method comprising the steps of:

providing a threaded fitting having a tubular opening therein extending through said fitting along a longitudinal axis thereof, said tubular opening having coaxial minor and major inside diameters with a coaxial conical transition therebetween at a thread/hex interface of said fitting;

providing a tube with a coaxial impacted, expanded, and sized end to an interference dimension relative to an inside diameter of said fitting;

inserting a non-expanded end of said tube through said major inside diameter of said fitting until interference is encountered;

pressing said tube into said fitting in coaxial alignment until said fitting is completely seated;

finishing an inside diameter of said tube coaxially with said fitting so that an inside diameter of said tube is substantially constant over a longitudinal length; and machining a female pilot land, an O-ring gland and an overall length of said fitting on an exposed end of said unitary assembly of tubing and fastener.

9. A method for forming a unitary assembly of tubing with a terminating fastener comprising the steps of:

providing a fitting having a tubular opening therein extending through said fitting along a longitudinal axis thereof and an enlarged major inside diameter opening adjacent one end thereof;

providing a tube having an enlarged diameter portion adjacent one end thereof;

inserting said tube through said enlarged major inside diameter opening of said fitting; and press fitting said enlarged diameter portion of said tube with a face-to-face interference fit within said enlarged major inside diameter opening of said fitting.

10. The method of claim 9 further comprising the steps of:

impacting an end of said tube to increase a wall thickness by approximately three fold;

expanding said end of said tube having said thickened wall; and sizing said expanded end of said tube to desired coaxial minor and major diameters with a conical transition therebetween sufficient to provide face-to-face interference fit with said enlarged major diameter opening of said fitting.

11. The method of claim 9 further comprising the steps of:

inserting a non-expanded end of said tube through said enlarged major inside diameter opening of said fitting until interference is encountered; and pressing said tube into said fitting in coaxial alignment until said fitting is completely seated.

12. The method of claim 9 further comprising the step of finishing an inside diameter of said tube coaxially with said fitting so that an inside diameter of said tube is substantially constant over a longitudinal length thereof.

13. The method of claim 9 further comprising the step of machining a female pilot land on an exposed end of the unitary assembly of tubing and fastener.

14. The method of claim 9 further comprising the step of machining an O-ring gland on an exposed end of the unitary assembly of tubing and fastener.

15. The method of claim 9 further comprising the step of machining an overall length of said fitting on an exposed end of the unitary assembly of tubing and fastener.

* * * * *